United States Patent
Kim

(10) Patent No.: US 12,462,021 B2
(45) Date of Patent: Nov. 4, 2025

(54) SEMICONDUCTOR MEMORY DEVICE AND METHOD FOR GENERATING MESSAGE AUTHENTICATION CODE THEREOF

(71) Applicant: SAMSUNG ELECTRONICS CO., LTD., Suwon-si (KR)

(72) Inventor: Ho-Youn Kim, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 424 days.

(21) Appl. No.: 18/059,067

(22) Filed: Nov. 28, 2022

(65) Prior Publication Data

US 2023/0409705 A1     Dec. 21, 2023

(30) Foreign Application Priority Data

Jun. 17, 2022    (KR) .................. 10-2022-0073859

(51) Int. Cl.
| | |
|---|---|
| *G06F 21/55* | (2013.01) |
| *G06F 21/60* | (2013.01) |
| *G06F 21/79* | (2013.01) |
| *H04L 9/32* | (2006.01) |

(52) U.S. Cl.
CPC .......... *G06F 21/554* (2013.01); *G06F 21/602* (2013.01); *G06F 21/79* (2013.01); *H04L 9/3242* (2013.01); *H04L 9/3278* (2013.01)

(58) Field of Classification Search
None
See application file for complete search history.

(56) References Cited

U.S. PATENT DOCUMENTS

| | | | |
|---|---|---|---|
| 8,000,477 B2 | 8/2011 | Verdun | |
| 8,036,380 B2 | 10/2011 | Gehrmann et al. | |
| 8,291,491 B2 | 10/2012 | Lee et al. | |
| 8,516,258 B2 | 8/2013 | Vauclair et al. | |
| 8,812,940 B2 | 8/2014 | Pilsl | |
| 2007/0174374 A1 | 7/2007 | Inoha | |
| 2011/0002461 A1* | 1/2011 | Erhart | G06F 21/73 |
| | | | 340/5.83 |
| 2018/0191512 A1 | 7/2018 | Tomishima | |
| 2021/0083869 A1 | 3/2021 | Grant | |
| 2021/0191881 A1 | 6/2021 | Kim et al. | |

(Continued)

FOREIGN PATENT DOCUMENTS

| | | |
|---|---|---|
| JP | 2007-281994 | 10/2007 |
| KR | 10-2021-0081009 | 7/2021 |

*Primary Examiner* — Nelson S. Giddins
(74) *Attorney, Agent, or Firm* — MORGAN, LEWIS & BOCKIUS LLP

(57) ABSTRACT

Disclosed is a semiconductor memory device comprising a memory core including a plurality of random-access memory cells, an error correction code (ECC) circuit configured to generate parity of data written to the memory core, and a message authentication code (MAC) control circuit configured to generate a security key based on a physical unclonable function (PUF) source signal in response to a message authentication code generation command or detection of a hacking or security attack, and configured to control the ECC circuit to generate a MAC on target data using the security key, wherein the ECC circuit operates in one of an ECC mode for generating an ECC parity and a MAC mode for generating the MAC under the control of the MAC control circuit.

20 Claims, 13 Drawing Sheets

(56) References Cited

U.S. PATENT DOCUMENTS

| | | |
|---|---|---|
| 2021/0250189 A1 | 8/2021 | Ahn et al. |
| 2022/0207190 A1* | 6/2022 | Chhabra ............... H04W 12/10 |
| 2024/0195640 A1* | 6/2024 | Lindskog .............. H04L 9/0866 |
| 2024/0348435 A1* | 10/2024 | Lu ........................ H04L 9/0877 |

\* cited by examiner

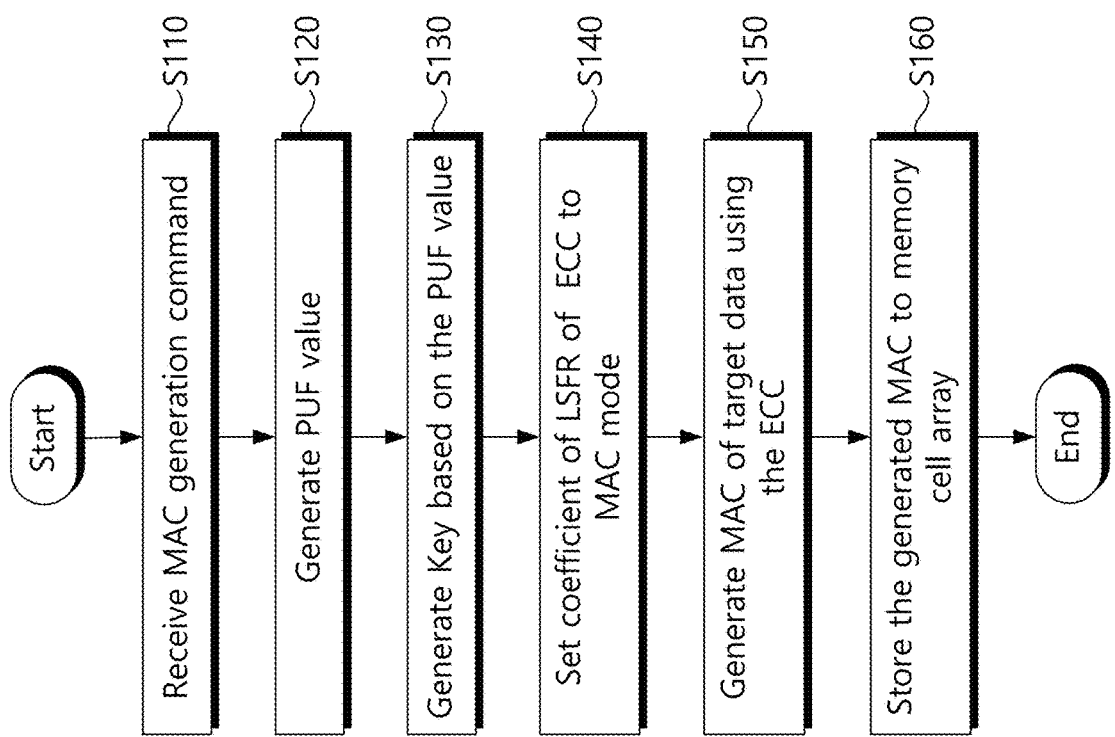

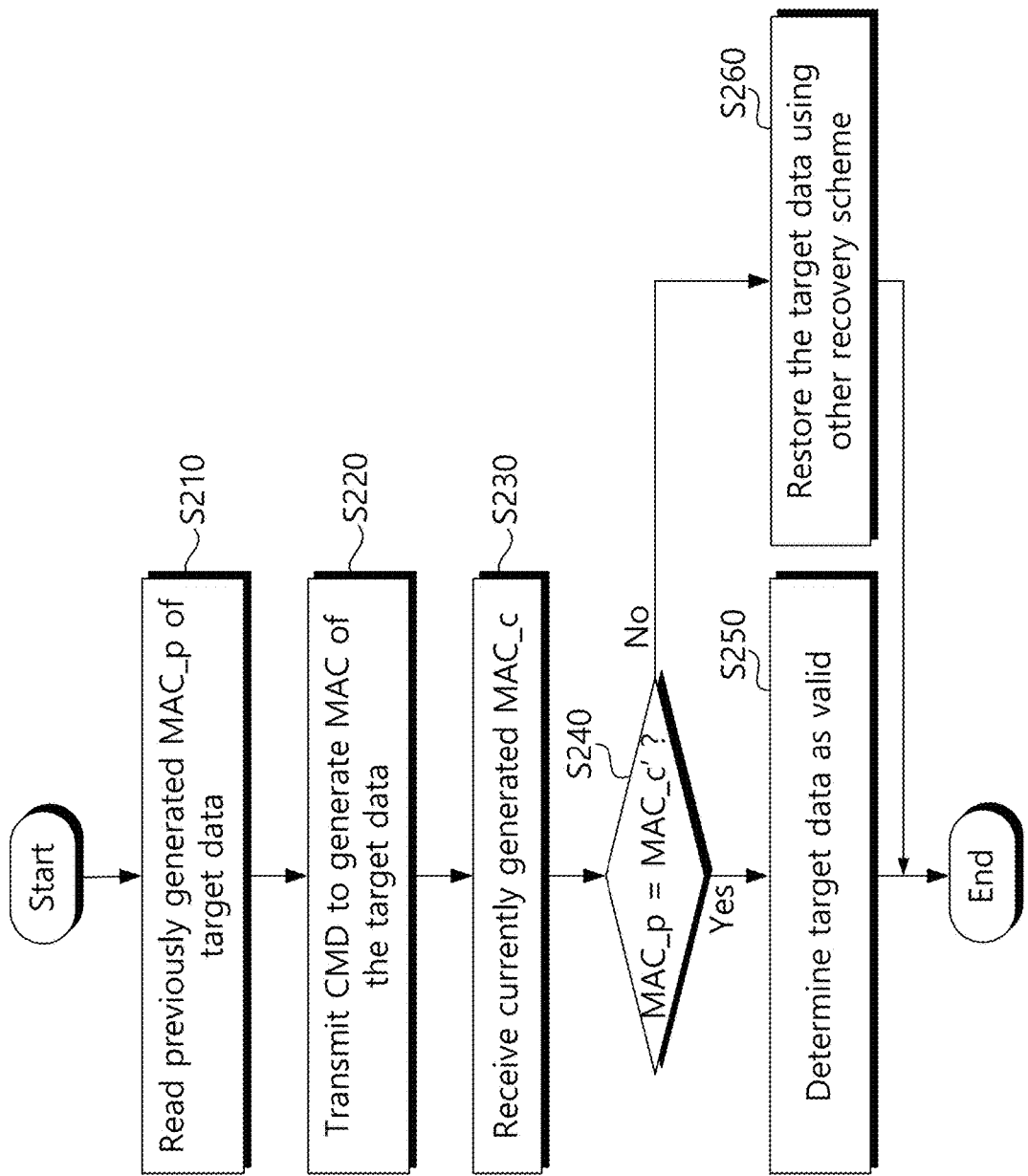

SEMICONDUCTOR MEMORY DEVICE AND METHOD FOR GENERATING MESSAGE AUTHENTICATION CODE THEREOF

CROSS-REFERENCE

This application claims priority under 35 U.S.C. § 119 to Korean Patent Application No. 10-2022-0073859 filed on Jun. 17, 2022, in the Korean Intellectual Property Office, the disclosure of which is incorporated by reference herein in its entirety.

FIELD

Exemplary embodiments of the present disclosure described herein relate to a semiconductor memory device, and more particularly, to a semiconductor memory device generating a message authentication code using a physical unclonable function (PUF), and a method for generating a message authentication code thereof.

DISCUSSION

In accordance with a desire for higher performance and capacity memories, the degree of integration and operation speed of semiconductor memory devices are rapidly increasing. In addition, various security technologies for ensuring data reliability of semiconductor memory devices have been proposed or applied according to increasing security desires. In particular, data reliability of a working memory used in a system, such as a server or a data center, is an important factor in determining service quality.

Recently, various hacking methods such as row-hammering, RAM-Bleed, cold boot attack, and cross-CPU attack have been reported. Security issues of tampering with or extorting data stored in a memory device using such security attacks are increasingly concerning.

SUMMARY

Embodiments of the present disclosure may provide a semiconductor memory device capable of ensuring the reliability of stored data from an attack on the memory device, and a method for generating a message authentication code thereof.

A semiconductor memory device comprising a memory core including a plurality of random-access memory cells, an error correction code (ECC) circuit configured to generate parity of data written to the memory core, and a message authentication code (MAC) control circuit configured to generate a security key based on a physical unclonable function (PUF) source signal in response to a message authentication code generation command or detection of a hacking or security attack, and configured to control the ECC circuit to generate an authentication code MAC on target data using the security key, wherein the ECC circuit operates in one of an ECC mode for generating a ECC parity and a MAC mode for generating the message authentication code MAC under the control of the MAC control circuit.

A semiconductor memory device, comprising a cell array including a plurality of random-access memory cells, a command decoder configured to decode an input command, an address decoder configured to decode an input address, an error correction code (ECC) circuit operating in one of an error correction code (ECC) mode for generating ECC parity of data written to the memory core and a message authentication code (MAC) mode for generating a message authentication code of target data, and a message authentication code (MAC) control circuit configured to generate a security key based on a physical unclonable function (PUF) source signal in response to a message authentication code generation command or detection of a hacking or security attack, and configured to control the ECC circuit to generate an authentication code on the target data using the security key.

A method for generating a message authentication code for a semiconductor memory device, the method comprising, generating a physical unclonable function (PUF) source signal, generating a security key from the PUF source signal, setting coefficients of a linear feedback shift register LFSR of an error correction code circuit using the security key, generating the message authentication code by inputting target data into the error correction code circuit, and storing the generated message authentication code in a memory cell array.

BRIEF DESCRIPTION OF THE DRAWINGS

The above and other embodiments of the present disclosure will become more apparent by describing in detail by way of example embodiments thereof with reference to the accompanying drawings.

FIG. 6 is a flowchart diagram schematically illustrating a method of generating a message authentication code (MAC) performed in a memory device of the present disclosure.

FIG. 7 is a flowchart diagram schematically illustrating a method of detecting data integrity in a memory controller according to an embodiment of the present disclosure.

DETAILED DESCRIPTION

Figure 1:
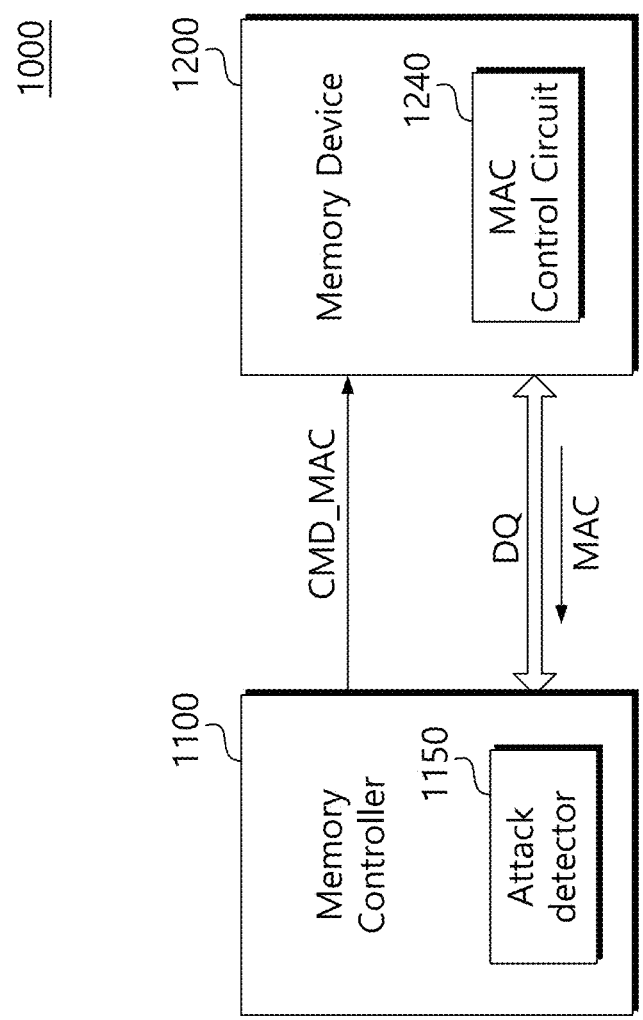
FIG. 1 is a block diagram illustrating a memory system including a memory device according to an embodiment of the present disclosure.

It is to be understood that both the foregoing general description and the following detailed description are presented by way of example, without limitation thereto. Reference indicia may be illustrated in detail in throughout the described embodiments of the present disclosure, including the examples thereof which are indicated in the drawings.

The same or like reference numbers or indica may be used throughout the description and drawings to refer to the same or like parts.

Hereinafter, a Dynamic Random-Access Memory (DRAM) will be used as an example of a semiconductor memory device for describing features and functions of the present disclosure by way of example. However, one of ordinary skill in the pertinent art will readily appreciate other embodiments of the present disclosure in accordance with the teachings herein. The present disclosure may be implemented or applied through other embodiments. Moreover, embodiment details may be modified or changed according to the viewpoint and application without departing from the scope, spirit or other aspects of the present disclosure.

FIG. 1 illustrates a memory system including a memory device according to an embodiment of the present disclosure. Referring to FIG. 1, a memory system 1000 of the present disclosure may include a memory controller 1100 and a memory device 1200.

The memory controller 1100 may perform an access operation for writing data to the memory device 1200 or reading data stored in the memory device 1200. The memory controller 1100 may generate a command CMD and an address ADDR for writing data to the memory device 1200 or reading data stored in the memory device 1200. In an embodiment, the memory controller 1100 may be at least one of a memory controller for controlling the memory device 1200, a system-on-chip (SoC) such as an application processor (AP), a CPU, and a GPU.

The memory controller 1100 may detect a hacking or security attack and provide a command to generate a message authentication code (MAC) for data stored in the memory device 1200. A command provided by the memory controller 1100 to the memory device 1200 to generate a message authentication code MAC is hereinafter referred to as a MAC generation command CMD_MAC. When a hacking attempt (e.g., a row hammering attack) against the memory device 1200 is detected, the memory controller 1100 may provide a MAC generation command CMD_MAC to generate a message authentication code MAC for the corresponding memory area or data or control signal to the memory device. Accordingly, the memory controller 1100 may include an attack detector 1150. The attack detector 1150 may monitor an access address to the memory device 1200 to detect a hammering attack on a specific row or memory area. In this case, the attack detector 1150 generates a detection result, and the memory controller 1100 sends a MAC generation command CMD_MAC to the memory device 1200 to generate a message authentication code MAC for data stored in the memory area.

In addition, the memory controller 1100 may store the message authentication code MAC generated by the memory device 1200 in a specific storage or other memory device. In addition, the memory controller 1100 may request the memory device 1200 for the message authentication code MAC of the memory region or data corresponding to the message authentication code MAC later when validation of the data is required. The validity of data may be determined by comparing a message authentication code MAC output in response to a request for a message authentication code MAC with an already stored message authentication code MAC.

The memory device 1200 outputs read data requested by the memory controller 1100 to the memory controller 1100 over a Data Qualification (DQ) bus or signal line, or stores data requested to be written by the memory controller 1100 in a memory cell. In particular, the memory device 1200 of the present disclosure generates a message authentication code MAC for the corresponding data or memory area in response to the MAC generation command CMD_MAC from the memory controller 1100. In particular, to generate the message authentication code MAC, the memory device 1200 may use a key generated through a physical unclonable function (PUF). The memory device 1200 may generate a message authentication code MAC for the target data based on the generated key. In this case, an error correction code circuit (ECC Circuit) provided in the memory device 1200 may be used to generate the message authentication code MAC. Accordingly, the memory device 1200 may include a MAC control circuit 1240.

Here, the memory device 1200 may be a high-bandwidth memory (HBM) or a next-generation Dynamic Random-Access Memory (DRAM), such as a Low-Power Double Data Rate (LPDDR) DRAM of LPDDR6 or LPDDR7 type, operating at ultra-speed. Alternatively, the memory device 1200 may be a Double Data Rate (DDR) Synchronous Dynamic Random Access Memory (SDRAM), LPDDR SDRAM, Graphics Double Data Rate (GDDR) SDRAM, Rambus Dynamic Random Access Memory (RDRAM), or the like. It may be a volatile memory device such as a Static Random-Access Memory (SRAM). Alternatively, the memory device 1200 may be a nonvolatile memory device such as a Resistive RAM (RRAM), a Phase-Change Random-Access Memory (PRAM), a Magnetoresistive Random-Access Memory (MRAM), a Ferroelectric Random-Access Memory (FRAM), a spin injection magnetization inversion memory, a Spin-Transfer Torque Random-Access Memory (STT-RAM), or the like. In the present disclosure, embodiments have been described based on DRAM, but the technical scope and spirit of the present disclosure is not limited thereto.

As described above, according to the configuration and function of the MAC control circuit 1240, the memory device 1200 of the present disclosure may generate a PUF-based message authentication code MAC. Through the message authentication code MAC, the memory controller 1100 may determine whether the corresponding data has been tampered with or hacked. In addition, the memory controller 1100 may take additional measures for data restoration according to the determination result.

Figure 2:
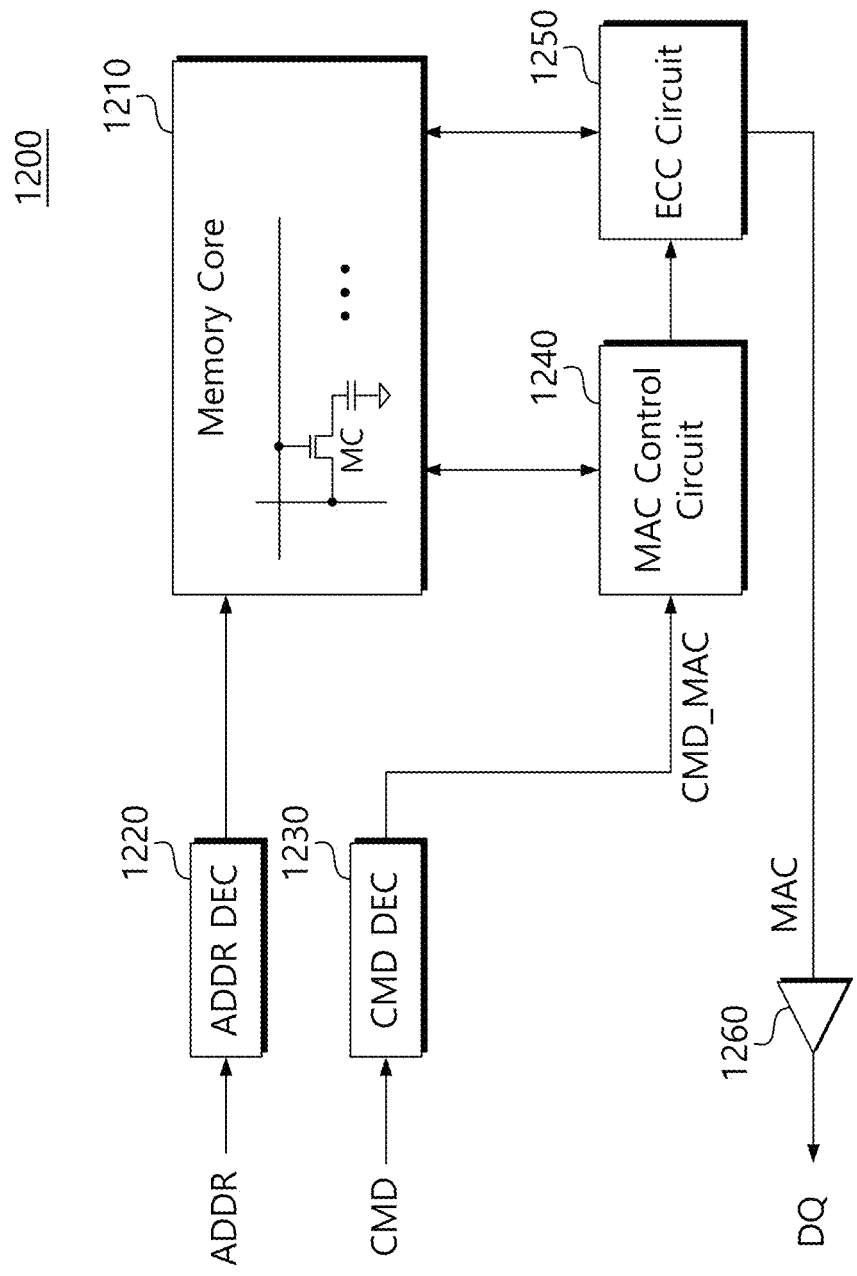
FIG. 2 is a block diagram exemplarily illustrating the memory device of FIG. 1.

FIG. 2 further illustrates the memory device of FIG. 1. Referring to FIG. 2, the memory device 1200 includes a memory core 1210, an address decoder 1220, a command decoder 1230, a MAC control circuit 1240, and an error correction code (ECC) circuit 1250.

The memory core 1210 includes a plurality of memory cells MC arranged in an array form, a decoder for selecting the memory cells MC, a write driver for writing data into the memory cells MC, and a sense amplifier for reading data. When a read command is input, the memory core 1210 may output read data sensed from the memory cell MC. When a write command is input, the memory core 1210 may write write-requested data to the selected memory cell MC. In addition, the memory core 1210 may provide a PUF source signal to the MAC control circuit 1240. In addition, the memory core 1210 may store the message authentication code MAC generated through the ECC circuit 1250 in a specific area. A driver 1260 may convert the MAC for transmission over the Data Qualification (DQ) bus or signal line to the memory controller 1100.

The address decoder 1220 transfers address signals ADDR provided through a command/address (CA) line to the memory core 1210. A block address, a bank address, a row address, and a column address may be provided to the memory core 1210 by the address decoder 1220.

The command decoder 1230 determines an input command with reference to signals (/RAC, /CAS, /WE) applied from the outside. The command decoder 1230 may write data to the cell array of the memory core 1210 or read the written data in response to a command provided from the outside. Also, the command decoder 1230 may write data to a mode register set (MRS, not shown) according to an externally provided command and address. For example, a general auto refresh command is input through a combination of control signals (/RAS, /CAS, /WE). Then, the refresh operation is determined by the command decoder 1230 and the refresh command is provided to the refresh control logic (not shown) by the mode register set MRS.

The MAC control circuit 1240 generates a message authentication code MAC for determining the validity of the data or memory area in response to the MAC generation command CMD_MAC. The MAC control circuit 1240 generates a key using a physical unclonable function PUF. In addition, the MAC control circuit 1240 provides the generated key to the ECC circuit 1250. In addition, the MAC control circuit 1240 may manage the operation mode of the ECC circuit 1250 as a message authentication code generation mode (hereinafter, MAC mode) and an error correction code mode (hereinafter, ECC mode). In MAC mode, the ECC circuit 1250 will generate a message authentication code MAC for the input data. The generated message authentication code MAC may be stored in a specific area provided in the memory core 1210. Alternatively, the generated message authentication code MAC may be stored by replacing the existing parity field. In addition, the generated message authentication code MAC may be output to the outside of the memory device 1200.

The ECC circuit 1250 performs an error correction operation or a message authentication code MAC generation in response to an operation mode provided by the MAC control circuit 1240. The ECC circuit 1250 performs an error detection or correction operation on input data in the ECC mode. For example, in the ECC mode, the ECC circuit 1250 generates ECC parity for input data. The ECC parity will be written to the parity field along with the data in the memory core 1210. In addition, when outputting data, the ECC circuit 1250 detects or corrects the error using ECC parity and outputs the corrected data.

On the other hand, the ECC circuit 1250 performs a MAC mode for generating a message authentication code MAC. The ECC circuit 1250 may generate a message authentication code MAC for the input data using the PUF-based key provided from the MAC control circuit 1240. The message authentication code MAC generated by the ECC circuit 1250 may be stored in a specific area of the memory core 1210. Alternatively, the message authentication code MAC generated by the ECC circuit 1250 may replace the parity field of data stored in the memory core 1210.

In the above, the memory device 1200 for generating the message authentication code MAC based on the physical unclonable function PUF using the MAC control circuit 1240 and the ECC circuit 1250 has been briefly described. The ECC circuit 1250 may operate in the ECC mode and the MAC mode. The memory device 1200 may generate the message authentication code MAC capable of checking the validity of data without a separate device. Accordingly, the memory device 1200 of the present disclosure may provide high data reliability.

Figure 3:
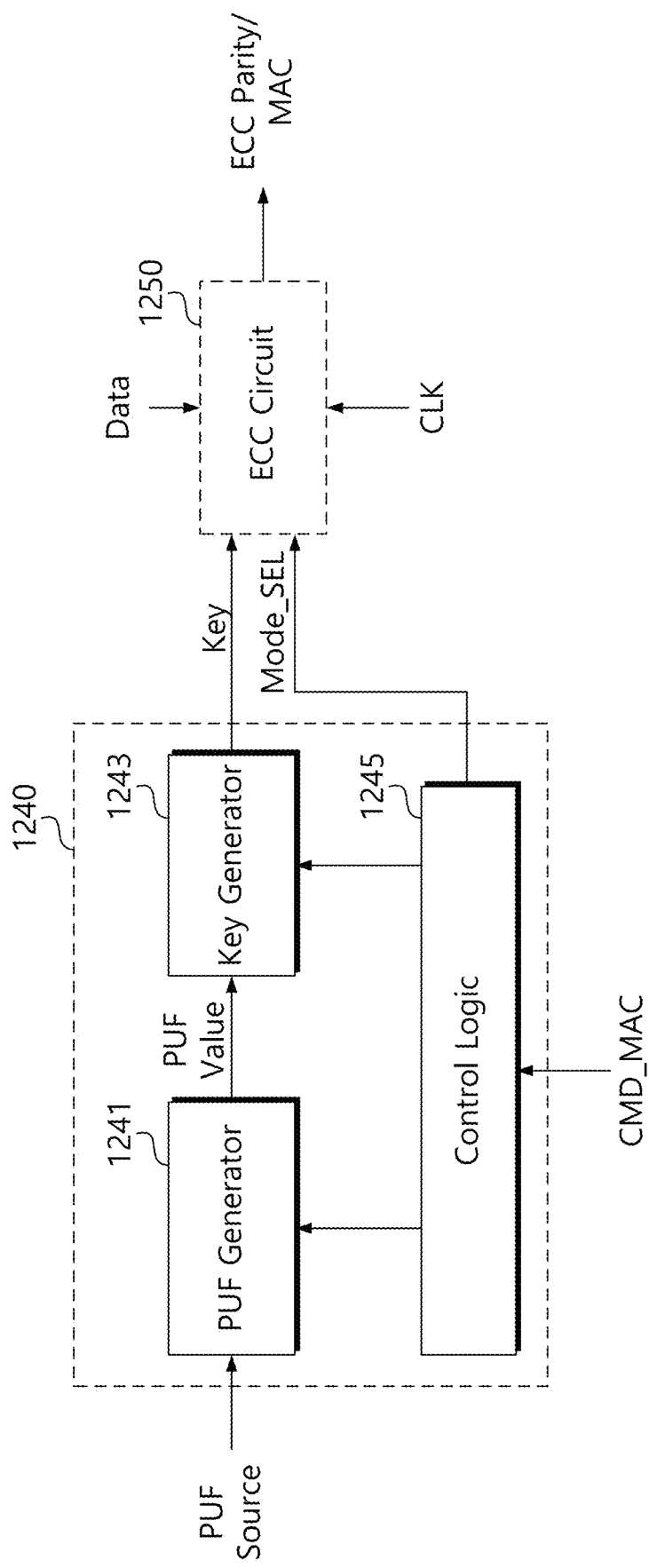
FIG. 3 is a block diagram showing the MAC control circuit and the ECC circuit of FIG. 2 in more detail.

FIG. 3 shows the MAC control circuit and the ECC circuit of FIG. 2 in more detail. Referring to FIG. 3, the MAC control circuit 1240 generates a key and a mode selection signal Mode_SEL in response to a MAC generation command CMD_MAC. In addition, the ECC circuit 1250 receives the key, the mode selection signal Mode_SEL, a clock signal CLK, and data to generate ECC parity or the message authentication code MAC.

The MAC control circuit 1240 includes a PUF generator 1241, a key generator 1243, and a control logic 1245. The PUF generator 1241 may generate a PUF value. To this end, the PUF generator 1241 may use a PUF source signal from the memory core 1210. For example, the PUF generator 1241 may receive a row hammer value or a start-up value for DRAM cells of the memory core 1210 as the PUF source signal. In an embodiment, the PUF generator 1241 may include at least one PUF source circuit that generates the PUF source signal.

Here, the PUF generator 1241 may generate a unique PUF value or key of the memory device 1200 based on the physical unclonable function PUF. The physical unclonable function PUF may refer to providing a unique value corresponding to the hardware based on an intrinsic characteristic of the hardware. For example, even if a plurality of hardware such as semiconductor chips are manufactured by the same process, each of the plurality of hardware may be physically unique, and slight variations may occur in the plurality of hardware. Based on these variations, the unique value of the hardware may be extracted, and the extracted value may be used for applications requiring security, such as secure communication, secure data processing, user identification, firmware update, and the like. In the present specification, the PUF source signal or the PUF value may mean a unique value or a set of unique values generated based on the above-described variations.

In some embodiments, the PUF source circuit that provides the PUF source signal to the PUF generator 1241 may have any structure that generates a unique bit signal. As a non-limiting example, the PUF source circuit may have an SRAM type PUF structure based on a value stored in a static random-access memory SRAM cell, and may have a ring oscillator structure based on frequency variation. Alternatively, the PUF source circuit may have a leakage-based PUF structure based on leakage current or the like, or may have an arbiter PUF structure in which a signal path is arbitrarily determined. Further, the PUF source circuit may generate a unique-valued bit signal based on differences in threshold levels of logic gates.

In one example, the PUF generator 1241 may include at least one of a PUF cell based on a transistor threshold voltage, a PUF cell based on an arbiter (e.g., a Feed-forward PUF cell, XOR PUF cells arranged in parallel with arbiter PUF cell, and lightweight PUF cell, etc.), a ring oscillator-based PUF cell, a memory-based PUF cell (such as Static Random Access Memory SRAM PUF cell), a latch PUF cell, a flash memory PUF cell, a memristor PUF cell, a reconfigurable PUF cell according to a laser beam or thermal change, and the like.

The key generator 1243 generates a key having a preset length based on the PUF value provided from the PUF generator 1241. The key is an encryption key that is uniquely generated by the MAC control circuit 1240. Since the integrity of the key is guaranteed, it may be used as a key for encryption and decryption or a key such as an authentication code. The key generator 1243 may determine whether the PUF value is valid and generate a key using valid data.

The control logic 1245 activates the key generator 1243 and the PUF generator 1241, respectively, in response to the MAC generation command CMD_MAC. In particular, the control logic 1245 generates a mode selection signal Mode_SEL for controlling the operation mode of the ECC circuit 1250 in response to the MAC generation command CMD_MAC. When the MAC generation command CMD_MAC is not received, the control logic 1245 may provide the mode selection signal Mode_SEL so that the ECC circuit 1250 operates in an ECC mode in which an error correction encoding or decoding operation is performed. However, when the MAC generation command CMD_MAC is input, the control logic 1245 provides the mode selection signal Mode_SEL so that the ECC circuit 1250 operates in the MAC mode.

When the mode selection signal Mode_SEL is in the ECC mode, the ECC circuit 1250 performs error correction encoding or error correction decoding on the data Data. During error correction encoding, the ECC circuit 1250 may generate ECC parity for the data Data. The generated ECC parity is stored in a parity field of the memory core 1210 in which data is stored. During error correction decoding, the ECC circuit 1250 processes input data and parity to detect whether an error exists. If there is a correctable error in the data, the ECC circuit 1250 will output the data to the outside after correcting the error.

When the mode selection signal Mode_SEL corresponds to the MAC mode, the ECC circuit 1250 generates a message authentication code MAC from the data Data based on a key value. The generated message authentication code MAC may be stored in a separate area from the parity field of the memory core 1210 or may be stored in a manner replacing the existing parity.

As described above, the MAC control circuit 1240 and the ECC circuit 1250 selectively perform an error correction operation and a message authentication code MAC generation operation according to the operation mode inside the memory device 1200. In particular, the MAC control circuit 1240 may generate a PUF-based key to control the operation mode so that the ECC circuit 1250 generates a message authentication code MAC.

Figure 4:
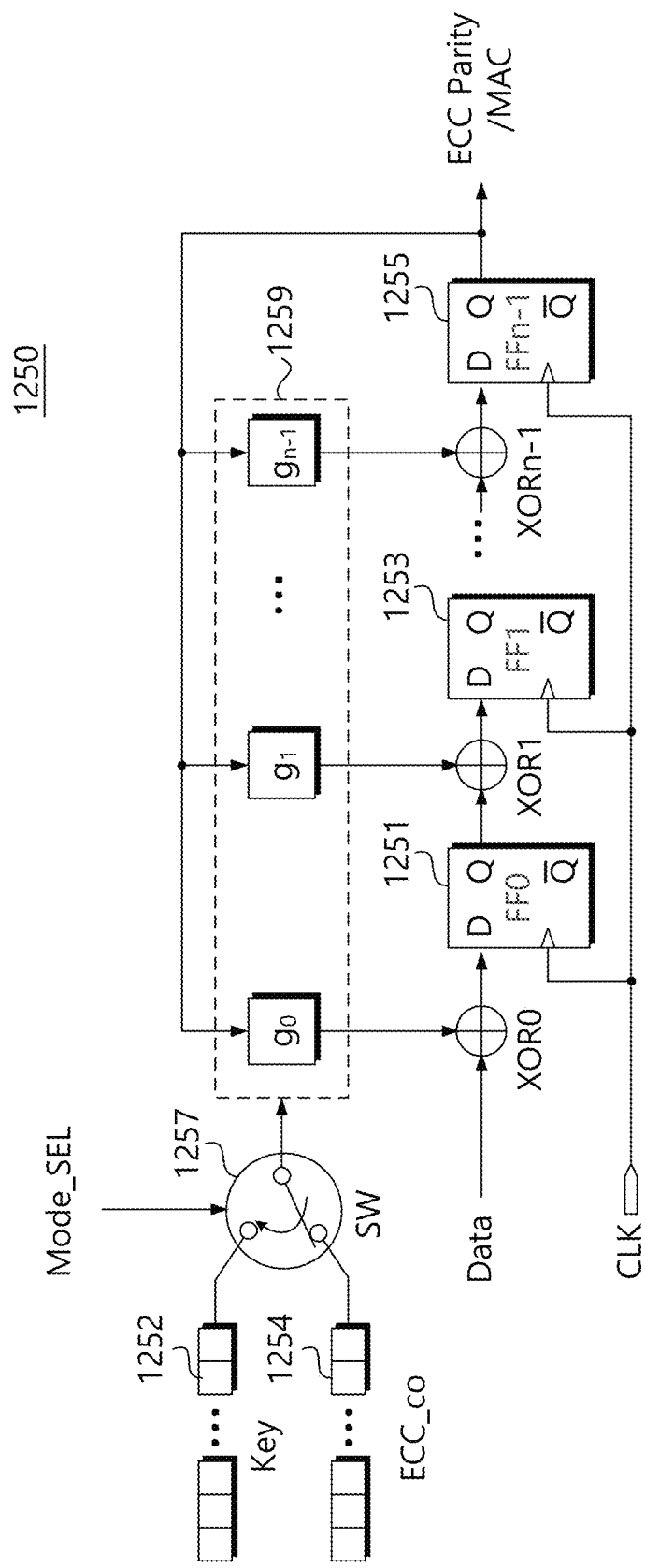
FIG. 4 is a block diagram showing an exemplary configuration of an error correction code (ECC) circuit according to an embodiment of the present disclosure.

FIG. 4 shows an exemplary configuration of an ECC circuit according to an embodiment of the present disclosure. Referring to FIG. 4, the ECC circuit 1250 may be implemented as a linear feedback shift register LFSR in which a coefficient can be changed according to an operation mode. To this end, the ECC circuit 1250 includes a plurality of flip-flops 1251, 1253, and 1255 for configuring the linear feedback shift register LFSR, exclusive-OR elements XOR0 to XORn-1, a coefficient selection switch 1257, and a coefficient storage unit 1259.

Hereinafter, it is assumed that the bit string of data is sequentially input. Then, the first bit of the data is processed by the generation coefficient $g_0$ and the first exclusive-OR element XOR0. In addition, the exclusive OR value of the first bit of the data and the generation coefficient $g_0$ is input to the flip-flop 1251 in synchronization with the clock signal CLK. In this way, the bit string of the data is sequentially processed by an exclusive-OR with the generation coefficient $g_0$ and input to the input terminal D of the flip-flop 1251.

The bit string input to the flip-flop 1251 in synchronization with the clock signal CLK is again synchronized with the clock signal CLK and output to the output terminal Q. Sequentially, the bit output from the output terminal Q is processed by the exclusive-OR element XOR1 by the generation coefficient $g_1$ with XOR operation. In a similar manner, in flip-flop 1255, the output value of the linear feedback shift register LFSR is provided as a parity or message authentication code MAC. The output value of the output terminal Q of the flip-flop 1255 is again sequentially transferred as generation coefficients $g_0$ to $g_{n-1}$.

In particular, the ECC circuit 1250 of the present disclosure includes the coefficient selection switch 1257 capable of selecting the coefficient according to the operation mode. It is assumed that the MAC control circuit 1240 generates the MAC mode in response to the input of the MAC generation command CMD_MAC. Then, the coefficient selection switch 1257 selects the key (Key, 1252) generated by the MAC control circuit 1240 using the PUF. Then, the coefficient storage unit 1259 will be set based on the key (Key, 1252) value. On the other hand, when the MAC control circuit 1240 generates the mode selection signal Mode_SEL corresponding to the ECC mode, the coefficient selection switch 1257 selects the basically provided ECC coefficients ECC_co 1254. Then, the initial coefficient value of the coefficient storage unit 1259 will be set to the ECC coefficients ECC_co.

In an embodiment, the ECC coefficients (ECC_co, 1254) may be set as default values in the coefficient storage unit 1259. In addition, when the mode selection signal Mode_SEL of the MAC mode is provided, the coefficient storage unit 1259 may be set to the key 1252 generated using the PUF.

As such, the ECC circuit 1250 of the present disclosure may operate in the ECC mode to perform an error correction operation, or may operate in the MAC mode to generate a message authentication code MAC. Although a linear feedback shift register LFSR capable of changing the coefficients has been described as an example of the ECC circuit 1250, the present disclosure is not limited to the disclosure herein. Various types of error correction code schemes capable of changing the operation mode may be used as the ECC circuit 1250 of the present disclosure.

Figure 5A:
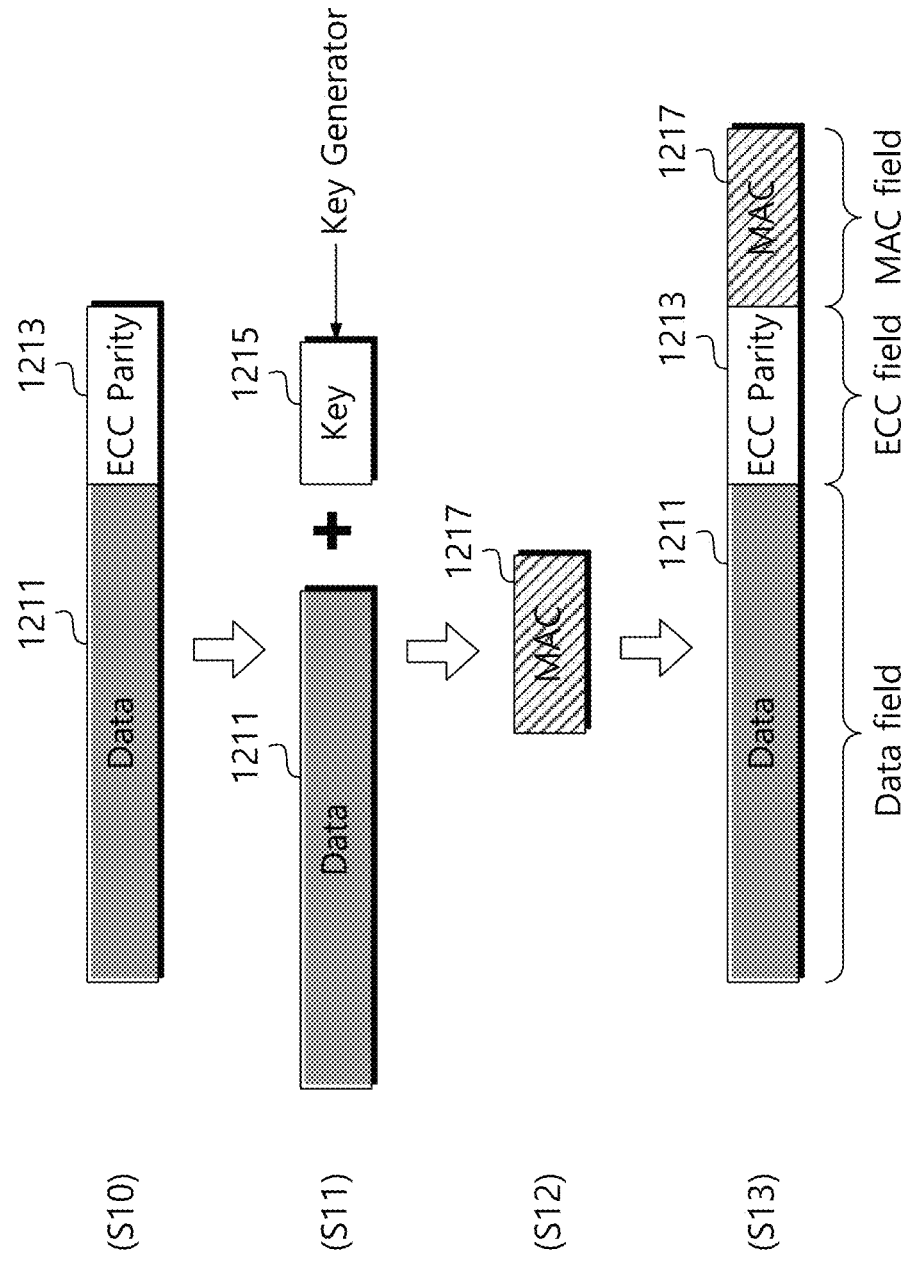
FIGS. 5A and 5B are data diagrams schematically illustrating a method for managing a message authentication code (MAC) according to an embodiment of the present disclosure.
Figure 5B:
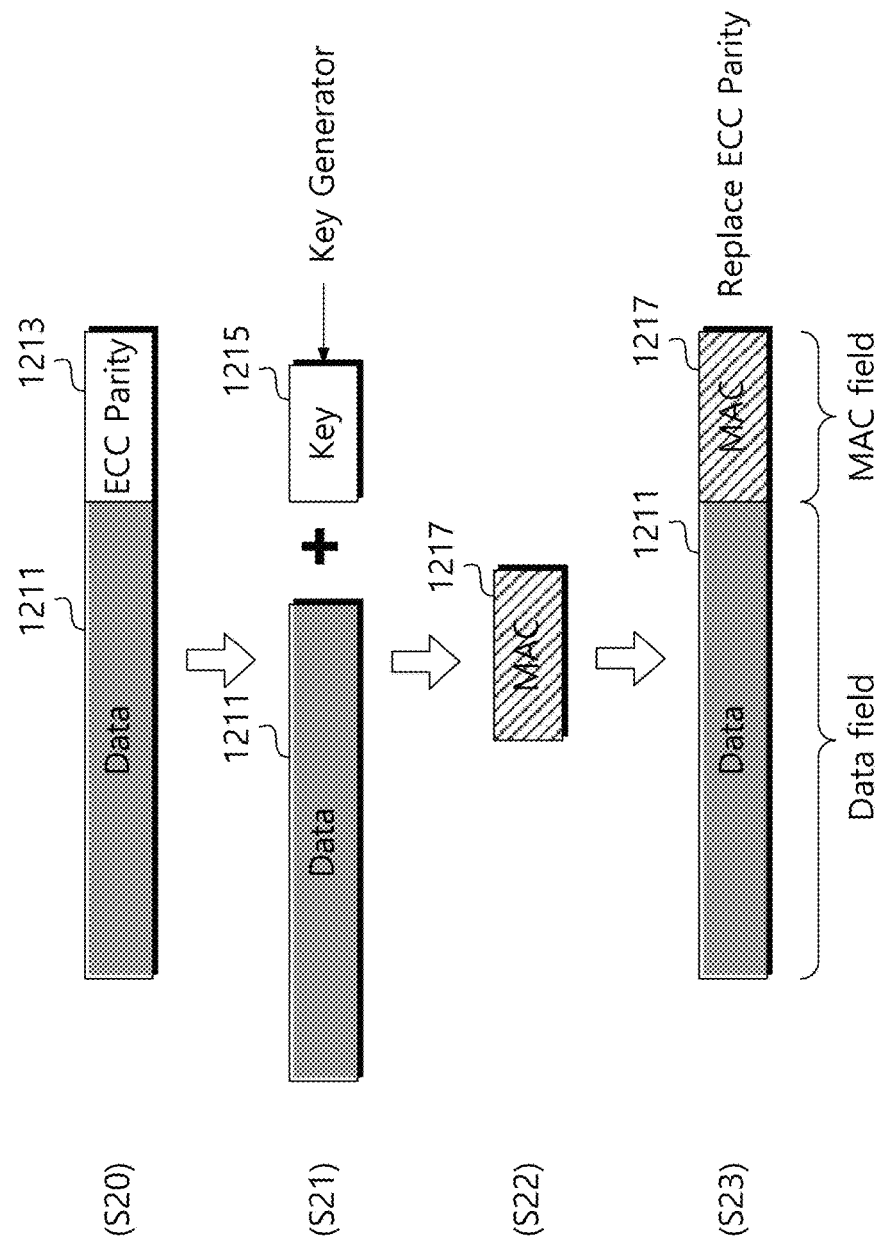

FIGS. 5A and 5B illustrate a method for managing a message authentication code MAC according to an embodiment of the present disclosure. Referring to FIG. 5A, the generated message authentication code MAC may be stored in a specific memory area or field together with ECC parity.

In step S10, the ECC circuit 1250 reads the data 1211 stored in the memory core 1210 under the control of the MAC control circuit 1240. In the memory core 1210, ECC parity 1213 generated by ECC encoding at the time of writing the data 1211 is stored together with the data 1211.

In step S11, the ECC circuit 1250 generates a message authentication code 1217 using the read data 1211 and the key 1215 generated based on the PUF in the MAC control circuit 1240. In order to set the MAC mode, the LFSR coefficient of the ECC circuit 1250 may be changed to the key value. The operation of generating the message authentication code MAC follows the MAC mode operation of the ECC circuit 1250 described above.

In step S12, the message authentication code 1217 generated by the ECC circuit 1250 is stored in the memory core 1210. In this case, the message authentication code 1217 may be stored in a specific area where security data is stored, or may be stored together with the data 1211. In addition, the message authentication code MAC may be output to the outside of the memory device 1200.

In step S13, the message authentication code 1217 is stored in the cell area of the memory core 1210 together with the data 1211 and the ECC parity 1213. If the user wants to check the integrity of the data 1211, the message authentication code MAC' that is generated in real time through the data 1211 may be compared with the message authentication code MAC 1217 that is already stored. When the already stored message authentication code MAC 1217 and the newly generated message authentication code MAC' are the same, it means that data integrity is maintained. However, if the two message authentication codes MAC, MAC' are different, it means that the data has been tampered with by hacking or attack. Accordingly, the user may recognize that a separate action is required for data restoration.

Referring to FIG. 5B, the generated message authentication code MAC may replace ECC Parity.

In step S20, the ECC circuit 1250 reads the data 1211 stored in the memory core 1210 under the control of the MAC control circuit 1240. In the memory core 1210, the ECC parity 1213 generated by ECC encoding when the data 1211 is written into the memory core 1210 is stored together with the data 1211.

In step S21, the ECC circuit 1250 generates the message authentication code 1217 using the read data 1211 and the key 1215 generated based on the PUF in the MAC control circuit 1240. In order to set the MAC mode, the LFSR coefficient of the ECC circuit 1250 may be changed to a value of the key 1215. The operation of generating the message authentication code MAC follows the MAC mode operation of the ECC circuit 1250 described above.

In step S22, the message authentication code 1217 generated by the ECC circuit 1250 is stored in the memory core 1210. In this case, the message authentication code 1217 may be stored in a specific area where security data is stored, or may be stored together with the data 1211. In addition, the message authentication code 1217 may be output to the outside of the memory device 1200.

In step S23, the message authentication code 1217 is stored in the cell area of the memory core 1210 together with the data 1211. In particular, the message authentication code 1217 may be stored in place of the ECC parity 1213. The target data used to generate the message authentication code 1217 may already be data that is concerned about hacking or security attacks. Accordingly, the target data may be subject to a data integrity check utilizing the message authentication code 1217 instead of error detection or error correction by the ECC circuit 1250.

When the user wants to check the integrity of the data, the message authentication code MAC' generated in real time may be compared with the already stored message authentication code MAC. If the two message authentication codes MAC, MAC' are identical, it means that data integrity is maintained. However, if the two message authentication codes MAC, MAC' are different, it means that the data has been tampered with by hacking or attack. Accordingly, the user may recognize that a separate action is required for data restoration.

In the above, examples of a method for managing a message authentication code MAC have been briefly described. However, it will be well understood that the management method of the message authentication code MAC is not limited to the above description and may be implemented in various management methods using various storage devices.

FIG. 6 illustrates a method of generating a message authentication code MAC performed in a memory device of the present disclosure. Referring to FIG. 6, the memory device 1200 (see, e.g., FIG. 1) generates and stores a message authentication code MAC for target data in response to a MAC generation command CMD_MAC from the memory controller 1100 (see, e.g., FIG. 1).

In step S110, the memory device 1200 receives the MAC generation command CMD_MAC provided from the memory controller 1100. The memory controller 1100 may generate a MAC generation command CMD_MAC by detecting that a security attack on a specific data area of the memory device 1200 is concerned or a security attack has occurred.

In step S120, the memory device 1200 generates a PUF value. For example, the PUF generator 1241 (see, e.g., FIG. 3) may use a Row hammer value or a Start-up value for DRAM cells of the memory core 1210 (see, e.g., FIG. 2) as a PUF source signal to generate a PUF value.

In step S130, the memory device 1200 generates a key based on the PUF value. For example, the key generator 1243 (see, e.g., FIG. 3) generates the key having a preset length based on the PUF value provided from the PUF generator 1241. For example, the key generator 1243 may determine whether the PUF value is valid, and generate the key using valid data.

In step S140, the MAC control circuit 1240 of the memory device 1200 sets the operation mode of the ECC circuit 1250 to the MAC mode. Then, the ECC circuit 1250 sets the key generated based on the PUF by the MAC control circuit 1240 as a coefficient of the linear feedback shift register LFSR.

In step S150, the ECC circuit 1250 generates the message authentication code MAC for the target data. That is, the ECC circuit 1250 is set to the MAC mode and generates the message authentication code MAC from the target data using the coefficient generated based on the key value.

In step S160, the message authentication code MAC generated by the ECC circuit 1250 of the MAC mode is stored in the memory core 1210. The message authentication code MAC may be stored in a separate area from the parity field, or may be stored in a way that replaces the existing ECC parity. In addition, the message authentication code MAC generated in step S150 may be output to the outside of the memory device 1200.

In the above, procedures for the method for generating and managing the message authentication code MAC in the memory device 1200 have been described.

FIG. 7 illustrates a method of detecting data integrity in a memory controller according to an embodiment of the present disclosure. Referring to FIG. 7, the memory controller 1100 (see, e.g., FIG. 1) receives a message authentication code MAC for target data from the memory device 1200 (see, e.g., FIG. 1) and determines data integrity. The data integrity check may be triggered by a user's request or detection of a security attack on the data.

In step S210, the memory controller 1100 reads a previous message authentication code MAC for the target data from the memory device 1200. The previous message authentication code MAC is a code generated by the MAC mode already performed on a specific area of the memory device 1200. The memory controller 1100 stores the previous message authentication code MAC read from the memory device 1200 in a specific memory device such as a cache or a register.

In step S220, the memory controller 1100 transmits the MAC generation command CMD_MAC to the memory device 1200 to generate the message authentication code MAC' at the current time for the target data. Then, the ECC circuit 1250 of the memory device 1200 reads the target data stored in the memory core 1210 under the control of the MAC control circuit 1240. And then the ECC circuit 1250 generate a message authentication code MAC' using the PUF-based generated key.

In step S230, when generation of the current message authentication code MAC' is completed, the memory device 1200 may output the current message authentication code MAC' to the outside. Then, the memory controller 1100 receives the current message authentication code MAC' generated in step S220.

In step S240, the memory controller 1100 compares the previous message authentication code MAC obtained in step S210 with the current message authentication code MAC' obtained in step S230. The previous message authentication code MAC and the current message authentication code MAC' are message authentication codes generated using the same PUF source from the same target data. Therefore, if there is no tampering or error of the target data, the previous message authentication code MAC and the current message authentication code MAC' should have the same value. If the previous message authentication code MAC and the current message authentication code MAC' are the same ('Yes' direction), the procedure moves to step S250. On the other hand, if the previous message authentication code MAC and the current message authentication code MAC' are different ('No' direction), the procedure moves to step S260.

In step S250, the memory controller 1100 determines that the target data is valid. That is, the memory controller 1100 determines that the target data has not been tampered with by hacking or a security attack. Then, the data integrity check operation may be terminated without an additional attempt to restore the target data by the memory controller 1100. Thereafter, an integrity check operation for other target data may be followed.

In step S260, the memory controller 1100 determines that the target data is invalid. That is, the memory controller 1100 may determine that the target data cannot be recovered in the same way as the error correction code ECC because the target data has been tampered with by hacking or a security attack. In addition, the memory controller 1100 may apply a separately provided recovery method for recovering the target data. For example, it may be possible to receive mirroring data for recovery from a remote server in which target data is distributed and stored, or other memory devices linked in a RAID method.

In the above, a method of using the message authentication code MAC of the present disclosure as a means for checking data integrity in the memory controller 1100 has been described. A method of checking data integrity using a message authentication code MAC will not be limited to the above-described example. That is, various error correction code ECC engines may be used to generate and manage message authentication code MAC.

Figure 8:
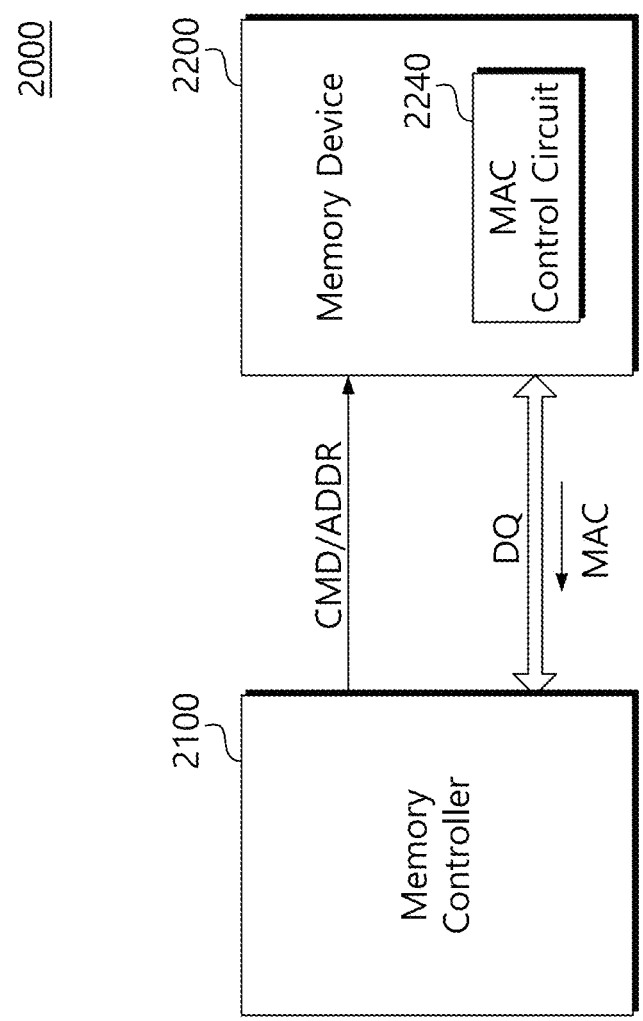
FIG. 8 is a block diagram illustrating a memory system including a memory device according to an embodiment.

FIG. 8 illustrates a memory system including a memory device according to an exemplary embodiment of present disclosure. Referring to FIG. 8, the memory system 2000 of the present disclosure may include a memory controller 2100 and a memory device 2200 for detecting a security attack or hacking and generating a PUF-based message authentication code MAC.

The memory controller 2100 writes data to the memory device 2200 or reads data stored in the memory device 2200. The memory controller 2100 may generate a command CMD and an address ADDR for writing data to the memory device 2200 or reading data stored in the memory device 2200. Unlike the memory controller 1100 of FIG. 1, the memory controller 2100 does not include an attack detector 1150 (see, e.g., FIG. 1) for detecting hacking or security attacks on the memory device 2200. Detection of hacking or security attack is performed by the memory device 2200 itself. Here, the memory controller 2100 may be at least one of a memory controller for controlling the memory device 2200, a system-on-chip (SoC) such as an application processor (AP), a CPU, and a GPU.

In addition, the memory controller 2100 may store the message authentication code MAC generated and output by the memory device 2200 in a specific memory device provided separately. In addition, the memory controller 2100 may request a corresponding message authentication code MAC from the memory device 2200 when validation of data or a memory area having the message authentication code MAC is required later. The validity of data may be determined by comparing the already generated and stored message authentication code MAC with the current message authentication code MAC.

The memory device 2200 outputs read data requested by the memory controller 2100 to the memory controller 2100 or stores data requested to be written by the memory controller 2100 in a memory cell. According to this embodiment, the memory device 2200 includes a MAC control circuit 2240 that detects hacking or a security attack. For example, the MAC control circuit 2240 may detect a hacking or security attack on a specific area or data through monitoring of the address ADDR. According to the detection result, the MAC control circuit 2240 generates a message authentication code MAC for the corresponding data or memory area.

To generate a message authentication code MAC, the memory device 2200 may use a key based on a physical unclonable function PUF source. In this case, an ECC circuit provided in the memory device 2200 may be used to generate the message authentication code MAC.

Here, the memory device 2200 may be a high-bandwidth memory (HBM) or a next-generation DRAM (e.g., LPDDR6 or LPDDR7) operating at ultra-speed. Alternatively, the memory device 2200 may be a volatile memory device such as a Double Data Rate Synchronous Dynamic Random Access Memory (DDR SDRAM), Low Power Double Data Rate (LPDDR) SDRAM, Graphics Double Data Rate (GDDR) SDRAM, Rambus Dynamic Random Access Memory (RDRAM), static random-access memory (SRAM), or the like. Alternatively, the memory device 2200 may be a nonvolatile memory device such as a resistive RAM (RRAM), a phase change memory (PRAM), a magnetoresistive memory (MRAM), a ferroelectric memory (FRAM), a spin injection magnetization reversal memory, a Spin-Transfer Torque Random-Access Memory (STT-RAM), or the like. In the present specification, the advantages of the present disclosure have been described based on DRAM, but the technical spirit of the present disclosure is not limited thereto.

As described above, according to the configuration and function of the MAC control circuit 2240 included in the memory device 2200, the memory device 2200 may generate a PUF-based message authentication code MAC. The generated message authentication code MAC may be transmitted to the memory controller 2100. Using the message authentication code MAC, the memory controller 2100 may determine whether the corresponding data has been tampered with or hacked.

Figure 9:
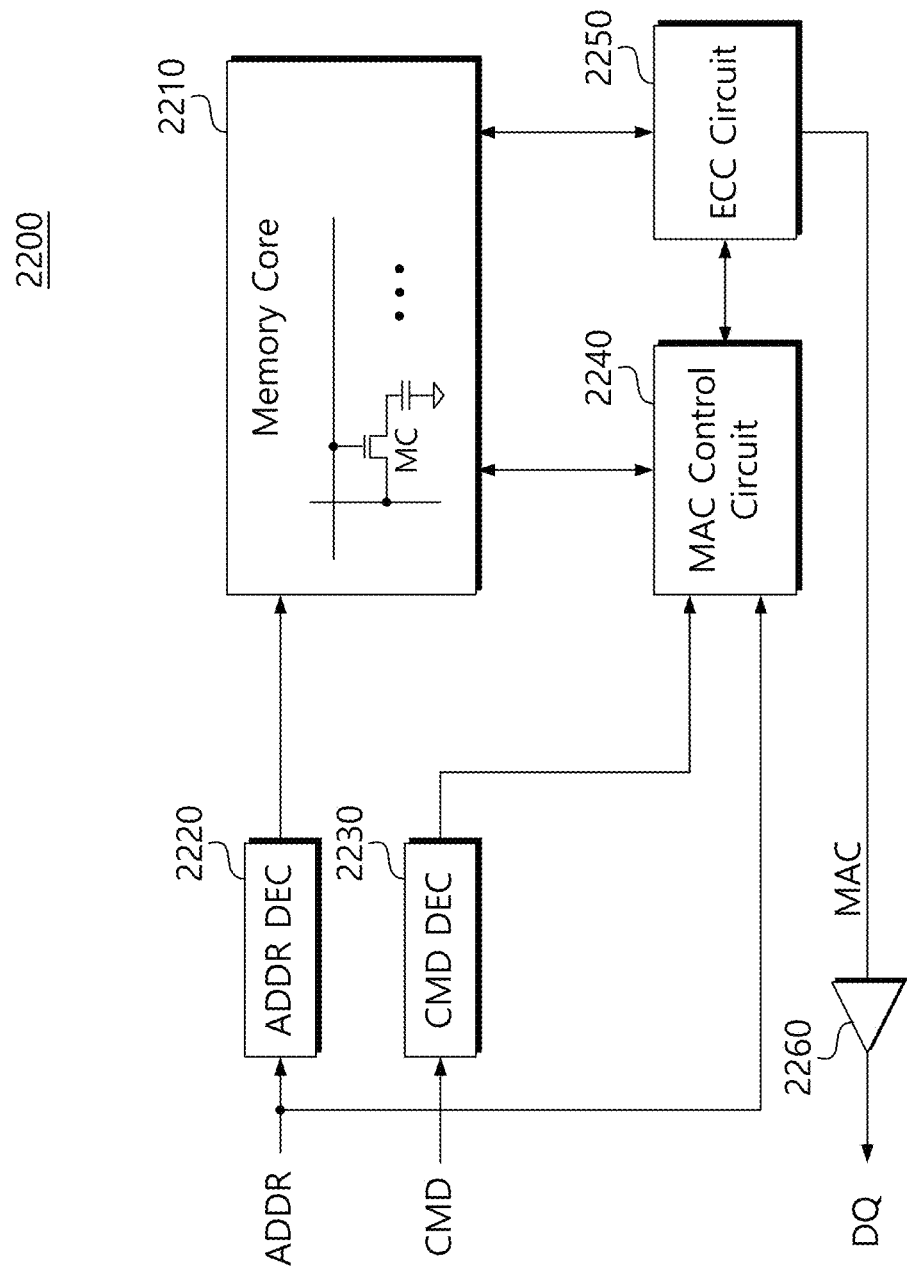
FIG. 9 is a block diagram exemplarily illustrating the memory device of FIG. 8.

FIG. 9 illustrates the memory device of FIG. 8. Referring to FIG. 9, the memory device 2200 includes a memory core 2210, an address decoder 2220, a command decoder 2230, a MAC control circuit 2240, and an ECC circuit 2250. Here, the memory core 2210, the address decoder 2220, the instruction decoder 2230, and the ECC circuit 2250 are substantially the same as those of FIG. 2. Accordingly, duplicate description thereof may be omitted.

The MAC control circuit 2240 detects a hacking or security attack, and generates a message authentication code MAC for determining the validity of the data or memory area targeted by the attack according to the detection result. The MAC control circuit 2240 generates a key using a physical unclonable function PUF. The MAC control circuit 2240 provides the key generated based on the PUF to the ECC circuit 2250. In addition, the MAC control circuit 2240 may manage the operation mode of the ECC circuit 2250 in the message authentication code mode (hereinafter, MAC mode) or an error correction mode (hereinafter, ECC mode). In MAC mode, the ECC circuit 2250 will generate a message authentication code MAC for the input data. The generated message authentication code MAC may be stored in a specific area provided in the memory core 2210. Alternatively, the generated message authentication code MAC may be stored by replacing the ECC parity stored in the existing parity field. In addition, the generated message authentication code MAC may be output to the outside of the memory device 2200 when a driver 2260 converts the MAC for transmission over the Data Qualification (DQ) bus or signal line to the memory controller 2100.

In the above, the memory device 2200 for detecting hacking or security attack using the MAC control circuit 2240 and the ECC circuit 2250, and generating the message authentication code MAC based on a physical unclonable function PUF has been briefly described. The ECC circuit 2250 may be set to any one of the ECC mode and the MAC mode. The memory device 2200 may generate the message authentication code MAC capable of checking the validity of data without a separate device. Accordingly, the memory device 2200 of the present disclosure may provide high data reliability.

Figure 10:
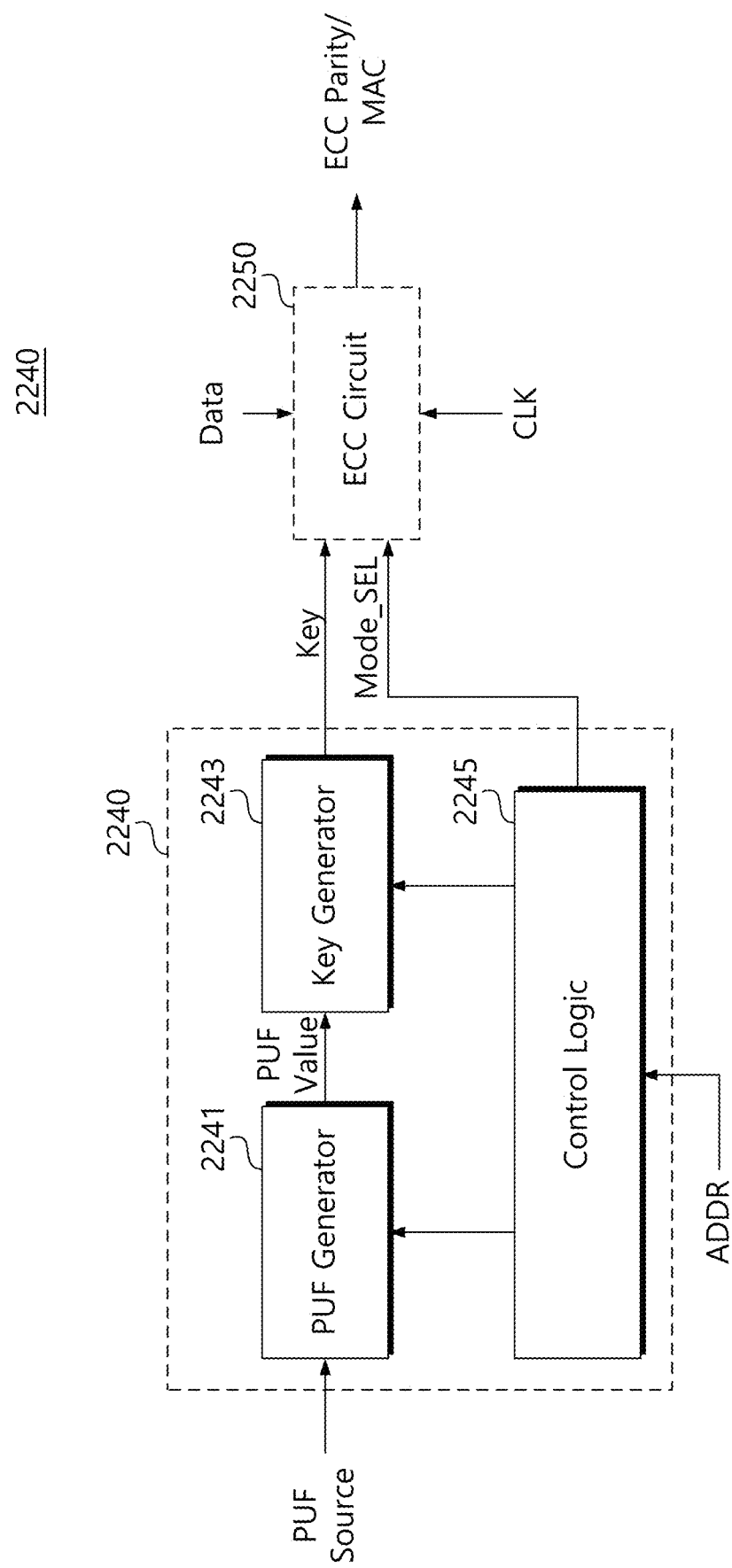
FIG. 10 is a block diagram showing the MAC control circuit and the ECC circuit of FIG. 9 in more detail.

FIG. 10 shows the MAC control circuit and the ECC circuit of FIG. 9 in greater detail. Referring to FIG. 10, the MAC control circuit 2240 detects a hacking or security attack, and generates a key and a mode selection signal Mode_SEL according to the result. The ECC circuit 2250 receives a key, a mode selection signal Mode_SEL, a clock signal CLK, and data Data, and generates an ECC parity or a message authentication code MAC.

The MAC control circuit 2240 may include a PUF generator 2241, a key generator 2243, and a control logic 2245. The PUF generator 2241 may generate a PUF value using the PUF source signal from the memory core 2210. For example, the PUF generator 2241 uses a row hammer value or a start-up value for DRAM cells of the memory core 2210 as the PUF source signal to generate a PUF signal. In an embodiment, the PUF generator 2241 may include at least one PUF source circuit.

In some embodiments, the PUF source circuit that provides the PUF source signal to the PUF generator 2241 may have any structure that generates a unique bit signal. As a non-limiting example, the PUF source circuit may have an SRAM type PUF structure based on a value stored in a static random-access memory SRAM cell, and may have a ring oscillator structure based on frequency variation. Alternatively, the PUF source circuit may have a leakage-based PUF structure based on leakage current or the like, or may have an arbiter PUF structure in which a signal path is arbitrarily determined. Further, the PUF source circuit may generate a unique-valued bit signal based on differences in threshold levels of logic gates.

The key generator 2243 generates the key to a preset length based on the PUF value provided from the PUF generator 2241. The key is an encryption key that is uniquely generated by the MAC control circuit 2240. Since the integrity of the key is guaranteed, the key may be used as a key for encryption and decryption or as a key such as an authentication code. The PUF generator 2241 and key generator 2243 are substantially the same as those of FIG. 3.

The control logic 2245 detects a hacking or security attack and activates the key generator 2243 and the PUF generator 2241. For example, the control logic 2245 may monitor the address ADDR to detect whether there is the hack or the security attack. When the hacking or security attack is detected, a mode selection signal Mode_SEL for controlling an operation mode of the ECC circuit 2250 is generated. When no hacking or security attack is detected, the control logic 2245 may provide a mode selection signal Mode_SEL so that the ECC circuit 2250 operates in an ECC mode in which an error correction encoding or decoding operation is performed. However, upon detecting the hacking or security attack, the control logic 2245 provides the mode selection signal Mode_SEL so that the ECC circuit 2250 operates in the MAC mode for generating the message authentication code MAC.

When the mode selection signal Mode_SEL is in the ECC mode, the ECC circuit 2250 performs error correction encoding or error correction decoding on the input data Data. During error correction encoding, the ECC circuit 2250 may generate ECC parity for input data Data. ECC parity is stored in data and a parity field of the memory core. In error correction decoding, the ECC circuit 2250 processes input data Data and ECC parity to detect whether an error exists. If there is a correctable error in the data, the ECC circuit 2250 will output the data to the outside after correcting the error.

When the mode selection signal Mode_SEL corresponds to the MAC mode, the ECC circuit 2250 generates a message authentication code MAC from input data Data based on a key value. The generated message authentication code MAC may be stored in a separate area from the parity field of the memory core 2210 or may be stored in a manner replacing the existing ECC parity.

Figure 11:
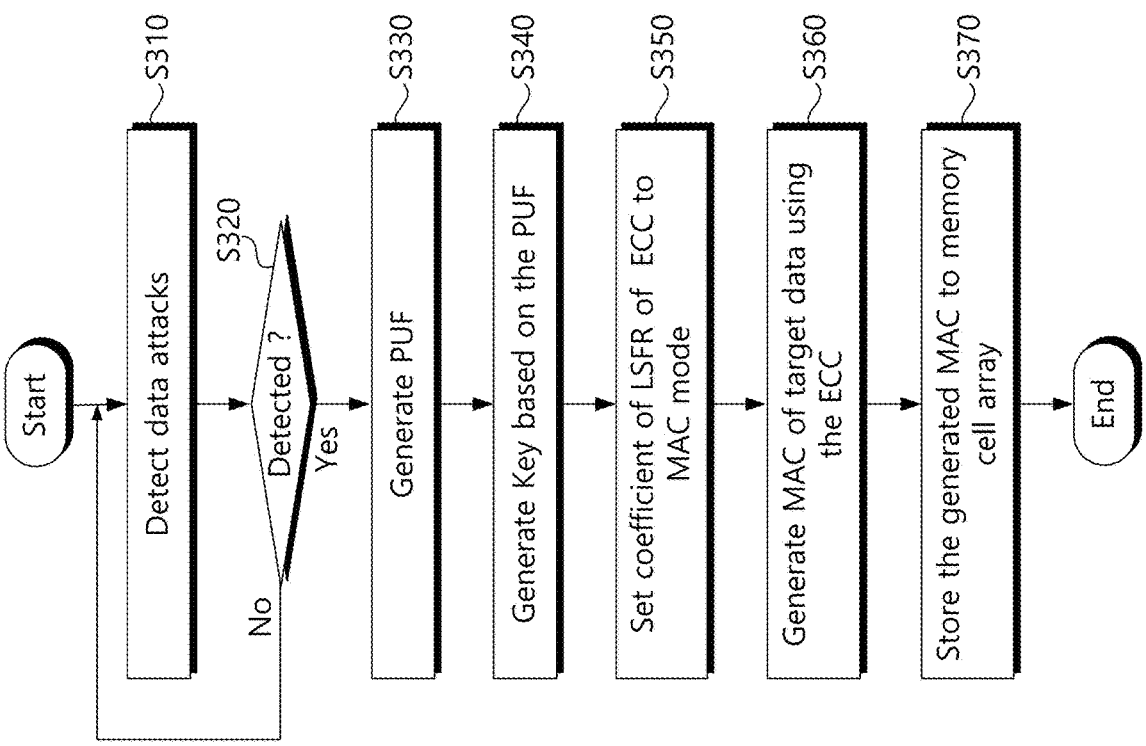
FIG. 11 is a flowchart diagram illustrating a method of generating a message authentication code (MAC) performed in the memory device of FIG. 9.

FIG. 11 illustrates a method of generating a message authentication code MAC performed in the memory device of FIG. 9. Referring to FIG. 11, the memory device 2200 (see, e.g., FIG. 9) detects a hacking or security attack to generate and store a message authentication code MAC for target data.

In step S310, the control logic 2245 included in the memory device 2200 may monitor the address ADDR to detect whether the hacking or security attack has occurred. It will be well understood that the detection method of the hacking or security attack on the memory device 2200 is not limited to address ADDR monitoring, and various means may be used.

In step S320, an operation branch occurs according to whether the hacking or security attack is detected. If the hacking or security attack is detected ('Yes' direction), the procedure moves to step S330. On the other hand, if no hacking or security attack is detected ('No' direction), the procedure returns to step S310.

In step S330, in response to detection of the hacking or security attack, the memory device 2200 generates the PUF value. For example, the PUF generator 2241 (see, e.g., FIG. 10) may use a Row hammer value or a Start-up value for DRAM cells of the memory core 2210 (see, e.g., FIG. 9) as the PUF source signal to generate the PUF value.

In step S340, the memory device 2200 generates a key based on the PUF value. For example, the key generator 2243 (see, e.g., FIG. 10) generates the key to a preset length based on the PUF value provided from the PUF generator 2241.

In step S350, the MAC control circuit 2240 of the memory device 1200 sets the operation mode of the ECC circuit 2250 to the MAC mode. Then, the ECC circuit 2250 sets the key generated by the MAC control circuit 2240 as a coefficient of the linear feedback shift register LFSR.

In step S360, the ECC circuit 2250 generates a message authentication code MAC from the input target data by using the coefficient generated based on the key value.

In step S370, the message authentication code MAC generated by the ECC circuit 2250 of the MAC mode is stored in the memory core 2210. The message authentication code MAC may be stored in a separate area from the ECC parity field, or may be stored in a way that replaces the existing ECC parity. In addition, the generated message authentication code MAC may be output to the outside of the memory device 2200.

According to the above flowchart, the memory device 2200 may detect the hacking or security attack by itself and generate the message authentication code MAC for the attack target or target data expected to be attacked.

Figure 12:
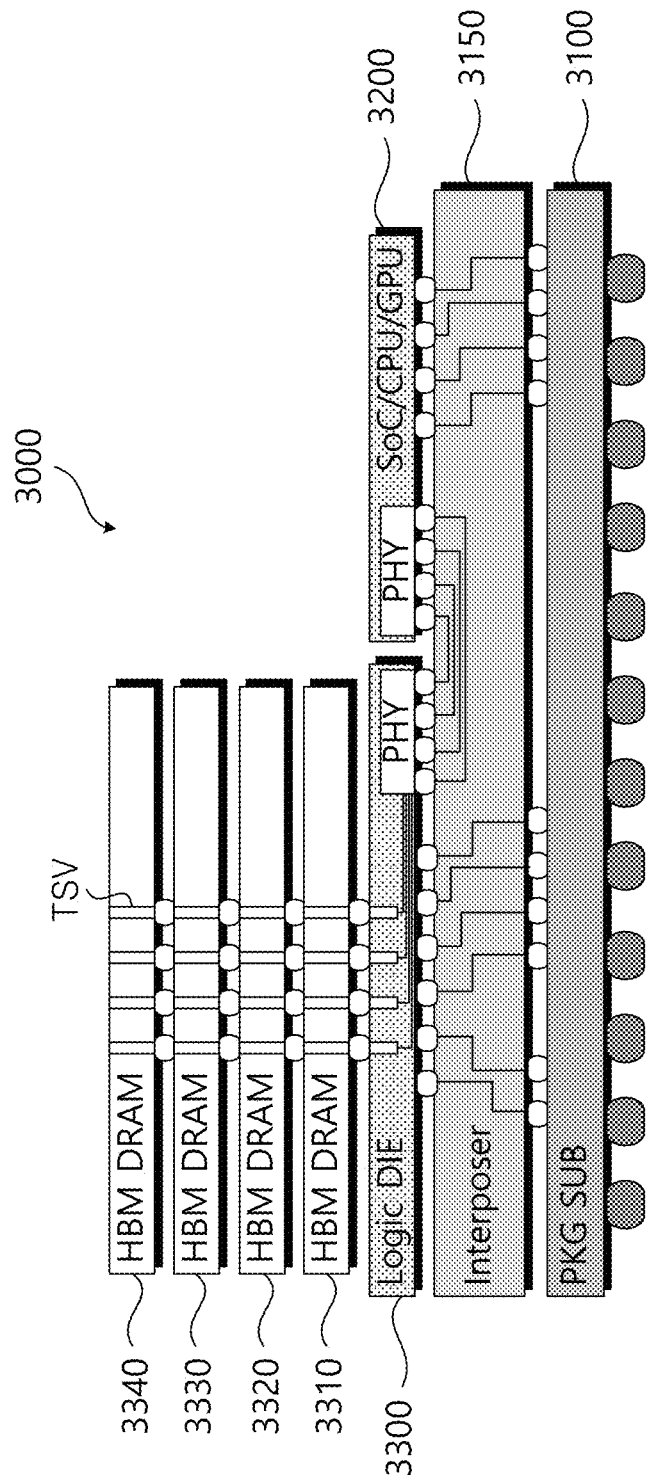
FIG. 12 is a cross-sectional diagram illustrating a memory system according to an embodiment of the present disclosure.

FIG. 12 illustrates a memory system according to an embodiment of the present disclosure. Referring to FIG. 12, a memory system 3000 implemented as a stacked memory includes a PCB substrate 3100, an interposer 3150, a host die 3200, a logic die 3300, and HBMs 3310 and 3320, 3330, 3340.

The memory system 3000 connects the HBMs 3310, 3320, 3330, and 3340 to the host die 3200 using the interposer 3150. The interposer 3150 is disposed on the PCB 3100 and is electrically connected to the PCB 3100 through flip chip bumps FB.

The host die 3200, the logic die 3300, and stacked HBMs 3310, 3320, 3330, and 3340 may be disposed on the interposer 3150. TSV lines are formed in the plurality of HBMs 3310, 3320, 3330, and 3340 to implement the memory system 3000. The TSV lines may be electrically connected to the micro bumps MB formed between the plurality of HBMs 3310, 3320, 3330, and 3340.

Here, the plurality of HBMs 3310, 3320, 3330, and 3340 may each generate a message authentication code MAC in response to a command from the host die 3200 or in response to detection of hacking or security attack. In particular, a physical unclonable function PUF value is used to generate a message authentication code MAC. The PUF value may be generated using a row hammer value or a start-up value for DRAM cells as a source. In addition, a message authentication code MAC may be generated using the generated PUF value using the ECC circuit provided inside each of the plurality of HBMs 3310, 3320, 3330, and 3340.

The above are specific embodiments provided for ease of description by way of example for carrying out the present disclosure. In addition to the above-described embodiments, those of ordinary skill in the pertinent art will recognize that other embodiments of the present disclosure may include changes to meet variable design criteria or the like. In addition, the present disclosure includes techniques that can be readily modified and implemented using combinations of features drawn from multiple embodiments. Therefore, the scope of the present disclosure should not be limited to the above-described embodiments, but should be defined by the claims to follow and equivalents thereof.

What is claimed is:

1. A semiconductor memory device, comprising:
a memory core including a plurality of random-access memory cells;
an error correction code (FCC) circuit configured to generate FCC parity of data written to the memory core; and
a message authentication code (MAC) control circuit configured to generate a security key based on a physical unclonable function (PUF) source signal in response to a message authentication code generation command or detection of a hacking or security attack, and configured to control the ECC circuit to generate an authentication code on target data using the security key,
wherein the ECC circuit operates in one of an ECC mode for generating the ECC parity and a MAC mode for generating the MAC under the control of the MAC control circuit.

2. The method of claim 1, wherein the MAC control circuit comprises:
a PUF generator configured to generate a PUF value having a unique bit value from the PUF source signal;
a key generator configured to generate the security key with a predetermined bit length from the PUF value; and
control logic configured to activate the PUF generator or the key generator, and configured to select one of the ECC mode and the MAC mode.

3. The device of claim 2, wherein the PUF source signal is generated from a row hammer value or a start-up value of the plurality of
random-access memory cells.

4. The device of claim 2, wherein the control logic generates a mode selection signal for selecting the MAC mode of the ECC circuit in response to the MAC generation command.

5. The device of claim 2, wherein the control logic detects the hacking or security attack from an input address, and generates a mode selection signal for selecting the MAC mode of the ECC circuit according to a detection result.

6. The device of claim 1, wherein the ECC circuit comprises:
a linear feedback shift register (LFSR) configured to process the data input in synchronization with a clock signal according to a coefficient set in a coefficient storage unit to generate the ECC parity or the MAC; and
a coefficient selection switch configured to set the coefficient storage unit by selecting one of an ECC coefficient and the security key according to the selected mode.

7. The device of claim 1, wherein the message authentication code is overwritten in a field area in which the ECC parity is stored in the memory core.

8. The device of claim 1, wherein the message authentication code is written in an area separate from a field area in which the ECC parity is stored in the memory core.

9. A semiconductor memory device, comprising:
a cell array including a plurality of random-access memory cells;
a command decoder configured to decode an input command;
an address decoder configured to decode an input address;
an error correction code (ECC) circuit operating in one of an ECC mode for generating ECC parity of data written to the memory core and a message authentication code (MAC) mode for generating a MAC of target data; and
a MAC control circuit configured to generate a security key based on a physical unclonable function (PUF) source signal in response to a message authentication code generation command or detection of a hacking or security attack, and configured to control the ECC circuit to generate MAC on the target data using the security key.

10. The device of claim 9, wherein the MAC control circuit comprises:
   a PUF generator for generating a PUF value having a unique bit value from the PUF source signal;
   a key generator for generating the security key with a predetermined bit length from the PUF value; and
   control logic for selecting one of the ECC mode and MAC mode.

11. The device of claim 10, wherein the PUF source signal is generated from a row hammer value or a start-up value of the plurality of random-access memory cells.

12. The device of claim 10, wherein the control logic is configured to select the MAC mode of the ECC circuit in response to the MAC generation command.

13. The device of claim 10, wherein the control logic is configured to detect the hacking or security attack from an address, and configured to select the MAC mode of the ECC circuit according to a detection result.

14. The device of claim 9, wherein the ECC circuit comprises:
   a linear feedback shift register (LFSR) configured to process the target data according to a coefficient set in a coefficient storage unit in synchronization with a clock signal to generate the ECC parity or the MAC; and
   a coefficient selection switch configured to set the coefficient storage unit by selecting one of an ECC coefficient and the security key according to the selected mode.

15. The device of claim 14, wherein the ECC coefficient is set as a default in the coefficient storage unit, and is changed to the security key in the MAC mode.

16. The device of claim 9, wherein the message authentication code is overwritten in a field area in which the ECC parity is stored in the cell array.

17. The device of claim 9, wherein the message authentication code is written in an area separate from a field area in which the ECC parity is stored in the cell array.

18. A method for generating a message authentication code (MAC) for a semiconductor memory device, the method comprising:
   generating a physical unclonable function (PUF) source signal;
   generating a security key from the PUF source signal;
   setting coefficients of a linear feedback shift register LFSR of an error correction code circuit using the security key;
   generating the MAC by inputting target data into the error correction code circuit using the coefficients; and
   storing the generated MAC in a memory cell array.

19. The method of claim 18, wherein the PUF source signal is generated from a row hammer value or a start-up value from a plurality of random-access memory cells.

20. The method of claim 18, further comprising:
   replacing the message authentication code with an error correction code parity of the target data.

* * * * *